United States Patent
Degand et al.

(10) Patent No.: US 6,670,581 B1
(45) Date of Patent: Dec. 30, 2003

(54) AUTOMOTIVE GLAZING PANEL HAVING AN ELECTRICALLY HEATABLE SOLAR CONTROL COATING LAYER

(75) Inventors: Etienne Degand, Jumet (BE); Christophe Maza, Jumet (BE)

(73) Assignee: Glaverbel, Brussels (BE)

( * ) Notice: Subject to any disclaimer, the term of this patent is extended or adjusted under 35 U.S.C. 154(b) by 0 days.

(21) Appl. No.: 09/926,520

(22) PCT Filed: May 1, 2000

(86) PCT No.: PCT/EP00/04200

§ 371 (c)(1),
(2), (4) Date: Nov. 30, 2001

(87) PCT Pub. No.: WO00/72635

PCT Pub. Date: Nov. 30, 2000

(30) Foreign Application Priority Data

May 20, 1999 (EP) ............................................. 99201567

(51) Int. Cl.$^7$ .................................................. B60L 1/02
(52) U.S. Cl. ...................................... 219/203; 219/522
(58) Field of Search ................................ 219/203, 522, 219/541, 543; 29/611; 439/149

(56) References Cited

U.S. PATENT DOCUMENTS

| | | | |
|---|---|---|---|
| 3,366,777 A | | 1/1968 | Brittan et al. |
| 4,023,008 A | * | 5/1977 | Durussel ..................... 219/522 |
| 4,196,338 A | * | 4/1980 | Edel ........................... 219/203 |
| 4,213,028 A | * | 7/1980 | Wolf ........................... 219/203 |
| 4,668,270 A | | 5/1987 | Ramus |
| 4,743,741 A | | 5/1988 | Ramus |
| 4,910,380 A | * | 3/1990 | Reiss et al. ................. 219/203 |
| 5,012,255 A | | 4/1991 | Becker |
| 5,099,250 A | | 3/1992 | Paulus et al. |
| 5,111,329 A | | 5/1992 | Gajewski et al. |
| 5,354,966 A | * | 10/1994 | Sperbeck ..................... 219/203 |
| 5,552,780 A | | 9/1996 | Knockeart |
| 5,846,854 A | * | 12/1998 | Giraud et al. ............... 439/149 |
| 5,898,407 A | | 4/1999 | Paulus et al. |
| 5,960,572 A | | 10/1999 | DeVito |
| 6,072,436 A | | 6/2000 | Marougi |
| 6,132,881 A | | 10/2000 | Hartig et al. |
| 6,185,812 B1 | * | 2/2001 | Castle et al. ................ 29/611 |

FOREIGN PATENT DOCUMENTS

| | | | | |
|---|---|---|---|---|
| DE | 3708577 | * | 9/1988 | ............ H05B/3/84 |
| DE | 4019703 | | 7/1991 | |
| DE | 19513263 | | 10/1996 | |
| EP | 378917 | | 7/1990 | |
| EP | 726232 | | 8/1996 | |
| EP | 0876083 | * | 4/1998 | ............ H05B/3/84 |
| FR | 2737075 | * | 1/1997 | ............ H05B/3/84 |
| GB | 2186769 | | 8/1987 | |
| JP | 6116153 | | 1/1986 | |
| JP | 246683 | | 2/1990 | |
| JP | 3281461 | | 12/1991 | |

* cited by examiner

Primary Examiner—Sang Y. Paik
Assistant Examiner—Leonid Fastovsky
(74) Attorney, Agent, or Firm—Piper Rudnick LLP; Jerold I. Schneider

(57) ABSTRACT

An automotive glazing panel having an electrically heatable solar control coating layer, spaced first and second bus bars adapted to relay electrical power to the coating layer and a data transmission window positioned at least partially in contact with the heatable solar control coating layer is arranged such that at least a portion of the periphery of the data transmission window is bounded by an electrically conductive band having an electrical resistance measured in ohms per square significantly less than the electrical resistance measured in ohms per square of the heatable solar control coating layer. This may be used to minimize perturbations to the heating of the glazing caused by the presence of the data transmission window and/or provide more even heating over the entire windscreen.

9 Claims, 2 Drawing Sheets

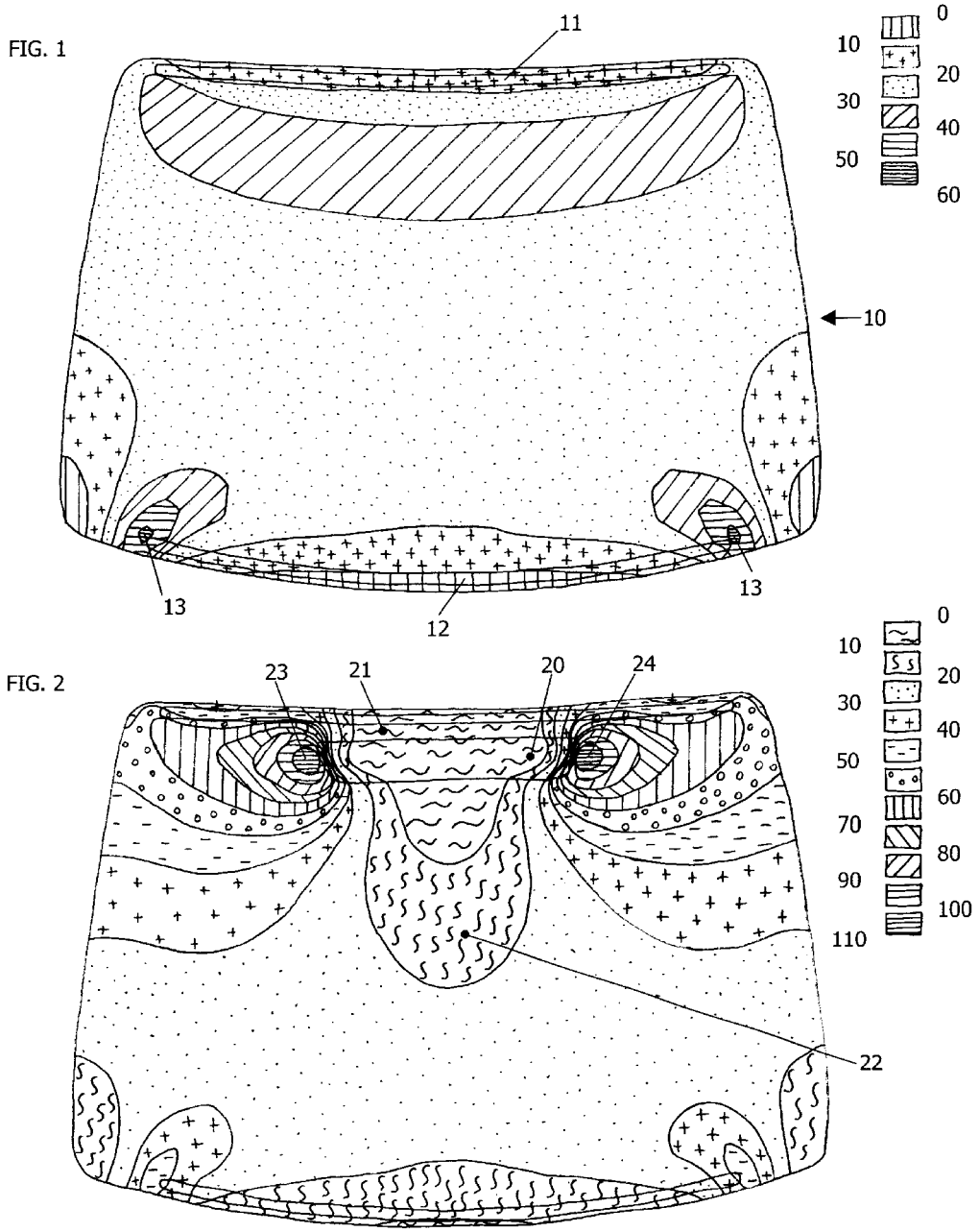

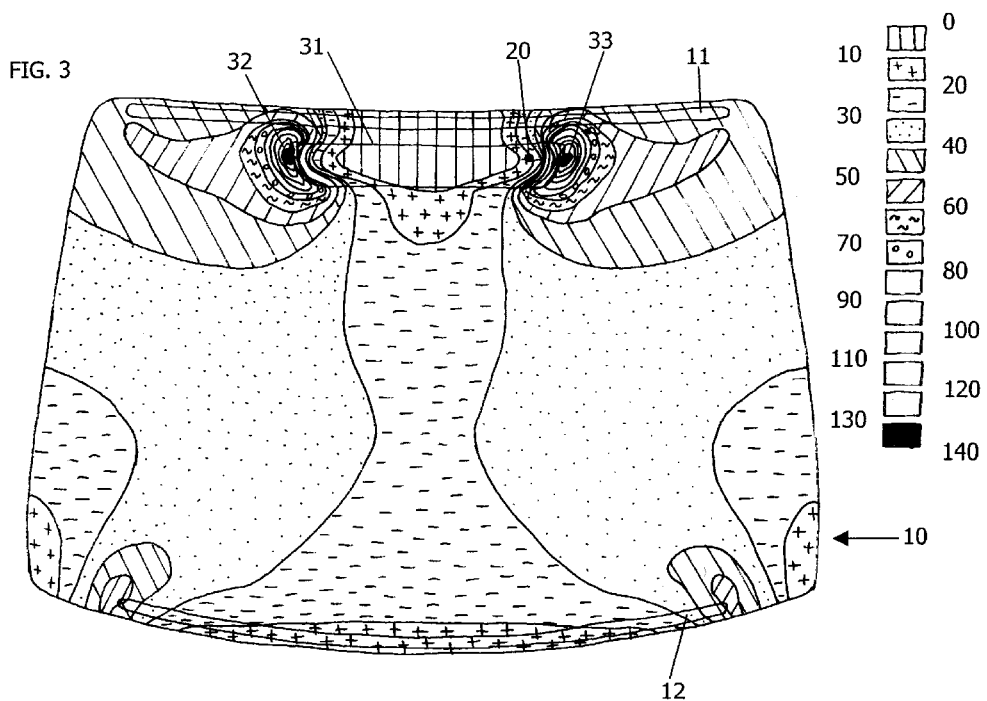
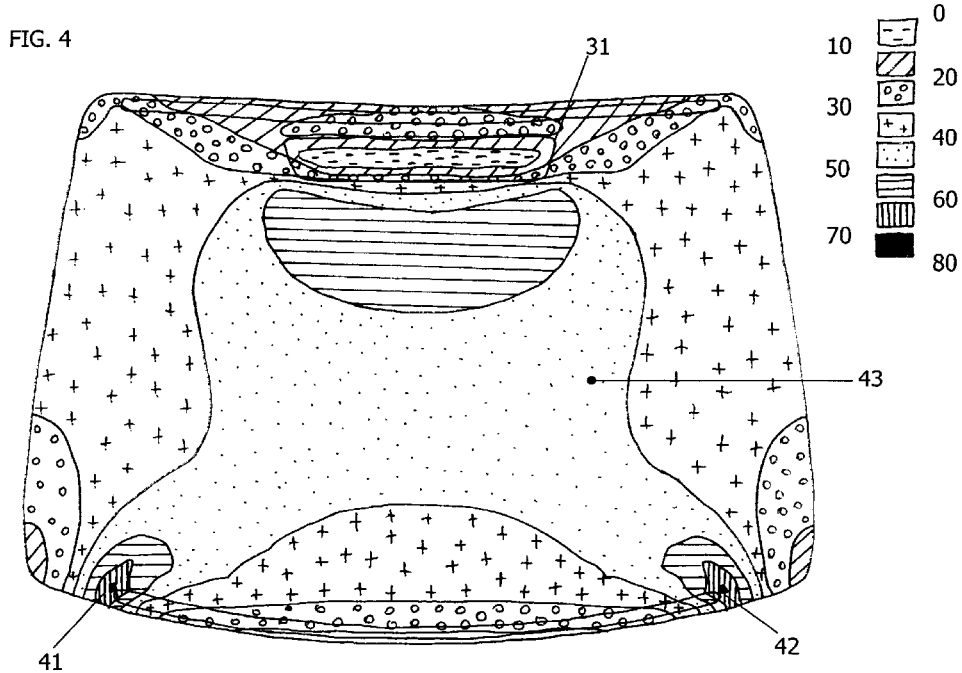

AUTOMOTIVE GLAZING PANEL HAVING AN ELECTRICALLY HEATABLE SOLAR CONTROL COATING LAYER

This application is the U.S. national stage of International Application No. PCT/EP00/04200 filed May 1, 2000 which claims priority from European Patent Application No. 99201567.7 filed May 20, 1999. The entirety of each of those applications is incorporated herein by reference.

BACKGROUND OF THE INVENTION

This invention relates to glazing panels and particularly but not exclusively to a vehicle windscreen having an electrically heatable coating layer provided with a data transmission window.

Although the invention is described herein with particular reference to car windscreens it will be understood that it has applications to other vehicle glazing panels, for example rear window and side windows.

U.S. Pat. No. 4,668,270 (Ford Motor Company) describes a car windscreen having an electrically heatable coating layer used for defrosting, de-icing and/or de-misting. The heatable coating, which is laminated between the two glass sheets of the windscreen, is supplied with electrical power via first and second bus bars which extend respectively along the top and bottom edges of the windscreen, each bus bar being silk screen printed on the glass in a silver ceramic material. The heatable coating is a multilayer coating consisting of layers of zinc oxide and silver formed by magnetron sputtering.

Coating layers are well know not only to provide an electrically heatable element but also to modify the optical properties of the glass, particularly to reduce the proportion of incident solar energy which is transmitted through the glass whilst allowing passage of sufficient visible light to ensure good visibility. This can reduce overheating of the interior of the vehicle in summer and is commonly achieved by reflection of incident solar radiation in the infra-red portion of the spectrum. EP378917A (Nippon Sheet Glass Co.) discloses such coating layers. The term solar control coating layer as used herein refers to a coating layer which increases the selectivity of the glazing panel i.e. the ratio of the proportion of incident visible radiation transmitted through the glazing to the proportion of incident solar energy transmitted through the glazing. Many solar control coating layers have the intrinsic property of being electrically heatable.

Sensors or emitters arranged inside a car may rely on passage of an electromagnetic data transmission signal through the windscreen. For example, passage of an electromagnetic data signal for automatic payment at the toll barriers used on the French motorway system may pass through the windscreen. However, passage of such electromagnetic data transmission signals may be hindered by the presence of a solar control coating and, consequently, a data transmission window in the form of a gap or hole may be provided in a solar control coating layer specifically to allow the passage of electromagnetic waves through that portion of the glazing. This principle is applicable to allowing passage of any electromagnetic data transmission signal through a glazing panel and particularly, but not exclusively, signals using infra-red wavelengths. The term data transmission window as used herein refers to a portion of the surface area of a glazing adapted to permit electromagnetic data transmission therethrough.

SUMMARY OF THE INVENTION

FIG. 1 shows a simulation of a heated car windscreen 10 having an electrically heatable coating layer over its entire surface supplied with electrical power by a first bus bar 11 and second bus bar 12. The windscreen is a laminated structure comprising two sheets of glass laminated together by means of a sheet of pvb, the electrically heatable coating layer and the bus bars being sandwiched between the two sheets of glass. This windscreen does not have a data transmission window and the heating effect is relatively uniform over the entire windscreen, the colours in the figure indicating the approximate relative temperature in centigrade of each portion of the glazing. It can be seen that a slight "hot spot" 13 is created around each end of the second bus bar 12.

All of the Figures are intended to give an indication of the relative temperatures at different portions of the glazing panel. The absolute temperatures will depend, inter alia, upon the nature of the heatable coating layer and the electrical voltage difference between the two bus bars (i.e. the power supplied to the windscreen). In addition, the Figures are intended to give an indication of the "stable" or "equilibrium" temperature distribution once the glazing panel has been heated for sufficient time to reach its maximum heated temperature. The scale of relative temperatures varies from one Figure to another.

FIG. 2 show a simulation similar to that of FIG. 1 save that a data transmission window 20 is incorporated in the arrangement. The data transmission window is a portion of this windscreen that does not have the heatable coating layer. As can be seen from the representation of the temperature at different points of the windscreen the data transmission window causes the following perturbations:

- an upper portion of the windscreen 21 at and around the data transmission window is not heated at all;
- a central portion 22 is heated but to a lesser extent than if the data transmission window is not present— consequently this portion will take longer to de-mist or de-ice than in the scenario without a data transmission window;
- hot spots 23 and 24 are created adjacent to the data transmission window—this is undesirable as such local overheating may damage or even bum the heatable coating layer and/or the adjacent pvb layer. It is also important to ensure that no portion of the windscreen is heated to such an extent that its temperature could cause burns to somebody touching it.

Whilst it would of course be possible to reduce the electrical power supplied to the bus bars so as to reduce the temperature of the "hot spots" this would of course reduce the temperature of the other parts of the windscreen at the same time and increase the time taken to de-mist or de-ice the overall windscreen.

One or both of these aspects may be used to reduce the perturbation to the heating of the glazing caused by the presence of the data transmission window. In particular, it may reduce or preferably eliminate the presence of undesirable hot spots and/or reduce the temperature difference between certain portions of the glazing.

The heatable coating layer may be a sputtered deposited coating, for example having the general structure antireflective dielectric layer/optional barrier layer/silver containing conductive layer/optional barrier layer/antireflective dielectric layer/optional barrier layer/silver containing conductive layer/optional barrier layer/antireflective dielectric layer. Such coatings are used in automotive glazings to increase the selectivity of the glazing (i.e. the ratio of the proportion of visible light transmitted to the proportion of incident solar energy transmitted) to reduce the solar heating or greenhouse effect in the vehicle. Such coating layers typically have a resistance in the order of 2 to 4 ohms per square. Alternatively, the heatable coating layer may have a single silver containing layer of the general structure antireflective dielectric layer/optional barrier layer/silver containing conductive layer/optional barrier layer/antireflective dielectric layer.

A further possibility is for the heatable coating layer to comprise a pyrolytically deposited layer based, for example on doped tin oxide. This might have a resistance in the order of 8–20 ohms per square.

The conductive band may have a resistance of less than, for example, 0.2, 0.1, 0.08, 0.06, 0.04, 0.02, 0.01, 0.008 or 0.005 ohms per square.

The heatable coating layer may be sandwiched between two sheets of glass or it may be an exposed coating layer, for example on a monolithic glazing panel.

The heatable coating layer may be deposited directly on a surface of the glazing or it may be carried on a film, for example a film of PET incorporated in the glazing.

The invention is particularly useful if the data transmission window is entirely surrounded by the heatable coating layer or entirely contained within or bounded by the heatable coating layer as it is in these cases that the perturbations caused by its presence will generally be greatest.

The greatest effect may be achieved by arranging the electrically conducting band around the entire periphery of the data transmission window. The conducting band may define the periphery of the data transmission window.

Generally, the greater the interruption or gap in the coating layer caused by the presence of the data transmission window the greater the resulting perturbation in the heating of the glazing. Consequently, the invention may be particularly beneficial with respect to elongate data transmission windows, particularly when these are positioned near or adjacent to one of the bus bars. Data transmission windows in solar energy reflecting windscreens have generally been arranged towards the top edge of the windscreen, roughly centrally between the two side edges. This facilitates orientation and positioning of data transmitting and/or receiving instruments. The invention is particularly suitable to allow this arrangement whilst in addition heating the coating layer provided on the glazing and minimising the heating perturbation that would otherwise be caused by the data transmission window.

The data transmission window preferably has a width comprised between 50 mm and 100 mm, and a length comprised between 80 mm and 210 mm. The data transmission window may have a width of at least 50 mm, 60 mm, 70 mm, 80 mm, 90 mm or 100 mm. It may have a width of less than 300 mm, 250 mm, 200 mm, 150 mm or 100 mm. The data transmission window may have a length of at least 80 mm, 100 mm, 120 mm, 140 mm, 160 mm, 180 mm or 210 mm. It may have a length of less than 400 mm, 350 mm, 300 mm, 250 mm or 210 mm.

The data transmission window preferably permits transmission of a greater proportion of incident electromagnetic data than the proportion of incident electromagnetic data transmitted by an equivalently sized portion of the glazing panel provided with the solar control coating.

The conducting band may be arranged, for example:

by applying or printing an electrically conducting (for example a silver containing) enamel on to the glazing panel either underneath or on top of the heatable coating stack. Such an enamel may be fired or cured as part of the processing of the glazing, for example during a heating, bending or tempering operation. Application of the conducting band may conveniently be carried out at the same time as applying the bus bars to the glazing. The conducting band may be arranged to be of the same material as the bus bars.

by applying or printing a conducting paint or lacquer so that it contacts the heatable coating layer.

by arranging a conducting bar, tape or trellis (for example a metal conductor) at the periphery of the data transmission window.

The conductive band may have a width of between about 2 mm and 20 mm, more particularly between about 5 mm and 10 mm. The width of the conductive band may vary along its length.

The conducting band may be masked or hidden from view either from the interior or the exterior of the vehicle or both, for example by means of an opaque masking band which may be of black enamel.

The method may be used to prevent or reduce the phenomena of hot

BRIEF DESCRIPTION OF THE DRAWINGS

In the drawings:

FIG. 1 shows a simulation of a heated car windscreen;

FIG. 2 shows a simulation of a heated car windscreen;

FIG. 3 shows a simulation of a heated car windscreen; and

FIG. 4 shows a simulation of a heated car windscreen.

DETAILED DESCRIPTION

Embodiment of the invention will now be described, by way of example only, with reference to FIG. 3 and FIG. 4, both of which are simulations of the heating effect of a windscreen.

Windscreens 10 illustrated in FIG. 3 and FIG. 4 comprises an inner sheet of glass laminated to an outer sheet of glass by means of a sheet of pvb. A heatable coating layer having a resistance of 3 ohms per square, a first bus bar 11 and a second bus bar 12 are arranged between the two sheets of glass. A data transmission window 20 (i.e. a portion at which there is no heatable coating layer) is arranged substantially centrally with respect to the width of the windscreen adjacent to the first bus bar 11 with a conducting band (not shown) arranged around its entire periphery 31.

In FIG. 3, the conducting band around the periphery of the data transmission window has an electrical resistance of 0.3 ohms per square. Heating of the windscreen by means of supplying electrical power via the bus bars produces the illustrated heating pattern. It can be seen in particular that although hot spots 32, 33 are present at the sides of the data transmission window these are less pronounced than in the arrangement of FIG. 2 (i.e. without the conducting band around the periphery of the data transmission window).

In FIG. 4, the conducting band 31 around the periphery of the data transmission window has an electrical resistance of 0.005 ohms per square. Heating of the windscreen by means of supplying electrical power via the bus bars produces the illustrated heating pattern. It can be seen in particular that:

the difference in temperature between portion 43 of the windscreen (in an area that is particularly important for driver visibility) and the hottest portion of the windscreen is substantially the same as that obtainable in the case of there not being a data transmission window (FIG. 1) and significantly less that the case of using a data transmission window without the benefit of the present invention (FIG. 2). This is advantageous for heating this particular (visibility critical) portion of the windscreen without creating significant undesirable overheating in other portions.

no significant hot spots are produced at the sides of the data transmission window the temperature of the central portion of the windscreen is greater than that obtained without the conducting band slight hot spots 41, 42 are produces at each end of the second bus bar 12 (as is the case without any data transmission window).

The power supplied in the case of FIG. 4 could be reduced so that the temperature of the central portion of the windscreen has the same temperature as the simulation without a data transmission window (FIG. 1). Not only will this lower the temperature of each portion of the windscreen allowing, for example, the temperature of the hot spots produced at each end of the second bus bar 12 to be reduced but it would also reduce the overall power required by the windscreen to produce a desired heating effect.

A convenient way of measuring the resistance per square of the conducting band and/or of the coating layer is using a four point measurement of resistance, as known in the art, for example using a four point resistance measurement device manufactured by Advanced Electronic Developments A.E.D.B. Sprl.

The invention may advantageously be combined with one or more know techniques or procedures in this art, for example:

spacing the electrically heatable coating layer from the external periphery of the windscreen by a non-conducting peripheral band (in which the coating layer has either not been deposited or has been removed) to prevent the electrically conductive coating extending to the very edge of the windscreen and/or to reduce the risk of corrosion of the coating layer.

What is claimed is:

1. An automotive glazing panel having an electrically heatable solar control coating layer, spaced first and second bus bars adapted to relay electrical power to the coating layer and a data transmission window positioned at least partially in contact with the heatable solar control coating layer characterised in that at least a portion of the periphery of the data transmission window is bounded by an electrically conductive band having an electrical resistance measured in ohms per square of at least one of the following features:

(a) less than 0.35;
(b) significantly less than the electrical resistance measured in ohms per square of the heatable solar control coating.

2. The automotive glazing panel in accordance with claim 1 and further including both of (a) and (b).

3. The automotive glazing panel in accordance with claim 1 wherein the electrical resistance of the electrically conductive band is less than 0.05 ohms per square.

4. The automotive glazing panel in accordance with claim 1 and further including at least one of the following:

(c) the data transmission window is entirely surrounded by the electrically heatable solar control coating layer;
(d) the data transmission window is substantially elongate in shape and positioned adjacent to one of the bus bars;
(e) the minimum distance between the periphery of the data transmission window and either of the first or second bus bars is less than 200 mm;
(f) at least one of the bus bars extends along a top portion of the glazing panel adjacent to a top edge of the glazing panel.

5. The automotive glazing panel in accordance with claim 1 and further including at least one of the following:

(g) the electrically conductive band is a silver containing enamel material;
(h) the electrically conductive band is a silver containing paint.

6. The automotive glazing panel in accordance with claim 1 wherein the glazing panel is an automotive windscreen.

7. A method of reducing the phenomena of hot spots in a glazing panel comprising:

providing an electrically heatable solar control coating layer;

providing a data transmission window; and arranging an electrically conductive band adjacent to at least a portion of the periphery of the data transmission window.

8. A method of reducing the phenomena of hot spots in a glazing panel comprising:

providing an electrically heatable solar control coating layer;

providing a data transmission window; and providing an electrically conductive band arranged in accordance with claim 1.

9. The method of claim 8 in which the electrically conductive band has an electrical resistance of less than 0.05 ohms per square.

* * * * *